Dec. 3, 1929. I. H. MERCER 1,737,936
GRADE METER
Filed Sept. 22, 1925
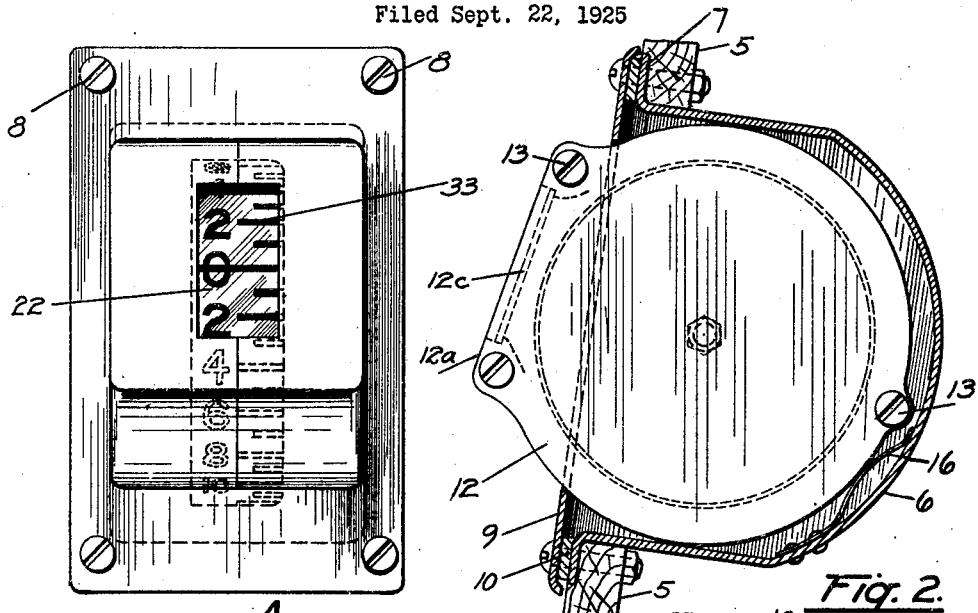
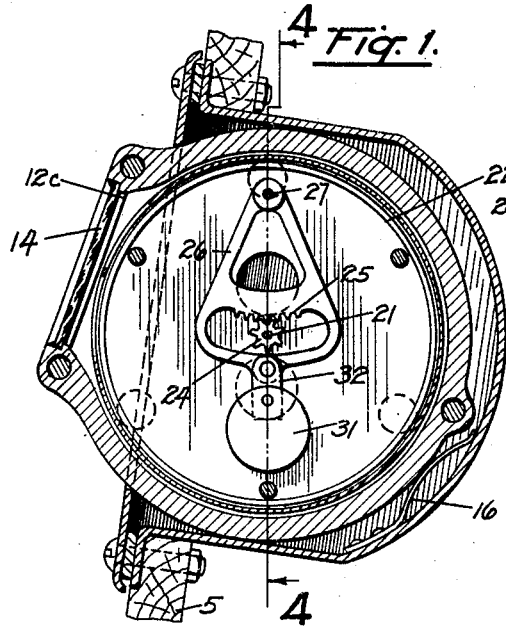
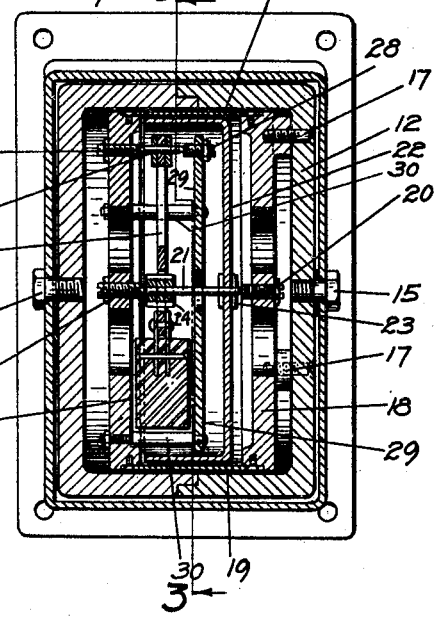
INVENTOR.
Ivan H. Mercer
BY
ATTORNEY.

Patented Dec. 3, 1929

1,737,936

UNITED STATES PATENT OFFICE

IVAN H. MERCER, OF DENVER, COLORADO, ASSIGNOR OF ONE-TENTH TO E. L. POUND, OF DENVER, COLORADO

GRADE METER

Application filed September 22, 1925. Serial No. 57,861.

The invention relates to grade-meters of the general type employed on vehicles to indicate the grade or inclination of a road along which the vehicle moves in either an ascending or descending direction.

Instruments of the above stated type are usually characterized by the provision of a rotary element adapted to maintain a horizontal position under the influence of a weighted pendulum and co-operating with a relatively fixed index-element on the dash or other part of the vehicle to designate the degree of inclination or declination of the road along which the vehicle is propelled.

It is an object of the present invention to provide in an instrument of this character, a reliable and efficient means for the ready adjustment of the index element of the instrument in correspondence with the position of the part of the vehicle to which it is applied; a further object is to provide a pendulum of novel construction which minimizes its tendency to vibrate by the motion and changes in inclination of the vehicle, and still other objects reside in details of construction and in a novel arrangement of parts all of which contribute separately and together to provide a device in which simplicity and compactness of construction are combined with efficiency and practicability in operation, particularly with relation to the accuracy and precision of the grade-indications.

An embodiment of the invention has been illustrated in the accompanying drawings in the several views of which corresponding parts are similarly designated and in which Figure 1 represents a face view of the improved grade-meter in its operative position on the dash-board of a motor vehicle;

Figure 2, an elevation of the instrument proper inside the fixed shell in which it is mounted, the shell having been shown in vertical section;

Figure 3, a vertical section of the instrument taken in a plane indicated by the line 3—3 in Figure 4; and Figure 4, a section along the line 4—4 in Figure 3.

Referring more specifically to the drawings, 5 designates the dash-board of a motor driven vehicle, provided with a rectangular opening for the application of my improved grade-meter.

In this connection it is to be understood that while it is preferred to mount the instrument on the dash-board of the vehicle, substantially in the manner shown and hereinafter to be described, where it can be constantly observed by the driver, it may be attached to any other conveniently located part of the car without lessening its usefulness or changing its mode of operation.

A protective shell 6 fitted in the opening of the dash-board has a flange 7 in a kerf around the opening for the application of screw-bolts 8 by which the shell is securely fastened to the board. A face plate 9 secured by the same screws partially covers the opening and a gasket 10 completes the joint between the parts.

The face plate has a rectangular opening through which projects the nose 12$^a$ of a cylindrical casing 12 in which the operating mechanism of the instrument is contained. The casing is preferably made in two halves fastened together by screws 13 and it has at the end of its nose-portion a sight-opening 12$^c$ closed by a glass plate 14. The casing is supported in the shell for pivotal adjustment about a central axis by means of bolts 15 and it is held frictionally in its adjusted position by a bow-spring 16 interposed between its peripheral surface and the corresponding inside surface of the shell.

Fastened within the casing by means of screws 17, is a mounting frame composed of two circular plates 18 connected in parallel spaced relation to each other by a circumferential wall-sheet 19 of thinner material.

Two bearing screws 20 in central threaded apertures of the two plates, are axially alined for the support of a spindle 21 upon which the hollow cylindrical indicator drum 22 of the mechanism is mounted by means of nuts 23. The spindle carries a pinion 24 which meshes with a sector-gear 25 on an oscillating arm or pendulum 26 suspended by means of a spindle 27 between two bearing-screws 28 at the upper portion of the mounting frame.

For the purpose of compactness in construction the pendulum is positioned within the hollow indicating drum which is open at one side and in order to support the pendulum in that position, the mounting-frame is supplemented by an auxiliary circular member 29 which is fastened in spaced relation to one of the side plates of the frame by bolts and distance-sleeves 30 and which supports one of the two bearing screws between which the spindle of the pendulum is pivoted for oscillatory motion.

The arm 26 of the pendulum has two openings, one above the other. The sector-gear 25 is disposed on one side of the lower opening to mesh with the pinion 24 on the shaft 21, which extends through the last mentioned opening. Pivotally suspended from the lower end of the arm 26 is a shorter arm or stem 32, from which is suspended a weight 31.

The drum bears upon its peripheral surface a scale of graduations 33 which by registration with the opening 12° of the casing as an index, indicate the degrees of inclination of the body of the vehicle on which the casing is secured.

The graduations extend in opposite directions from a zero point and the pendulum and its gear-connections with the drum are proportioned so that a displacement of the casing through an arc not exceeding one-half of the circumference of the indicating drum will approximately equal a grade of $32\frac{1}{2}°$ which is about the maximum in ordinary road construction.

The scale may thus be divided into graduations each equaling 1/36 of the circumference of the drum, whereby to correctly indicate the grade variations on a scale sufficiently large to be easily read by the occupants of the vehicle.

It will be apparent that the improved instrument combines simplicity and compactness of construction with a wide range of clearly perceptible grade indications; that the ready adjustment of the casing which constitutes the index element of the instrument permits of it being instantly placed in a position in which its opening registers with the zero mark of the scale when the vehicle body to which the casing is fastened, is substantially horizontal, and that the peculiar construction of the pendulum is particularly adapted to maintain the indicator element in a state of equilibrium.

What I claim and desire to secure by Letters Patent is:

1. A grade meter comprising a casing having a sight opening, a wheel mounted for rotation in the casing and bearing a graduated scale in register with the sight opening, and a pendulum in operative connection with the wheel and consisting of an arm, a weight and a stem pivotally connected with the arm and with the weight.

2. A grade meter as described in claim 1, the stem being shorter than the arm.

In testimony whereof I have affixed my signature.

IVAN H. MERCER.